(No Model.)
F. J. SPRAGUE.
ELECTRIC MOTOR AND REGULATING DEVICE THEREFOR.
No. 481,739. Patented Aug. 30, 1892.
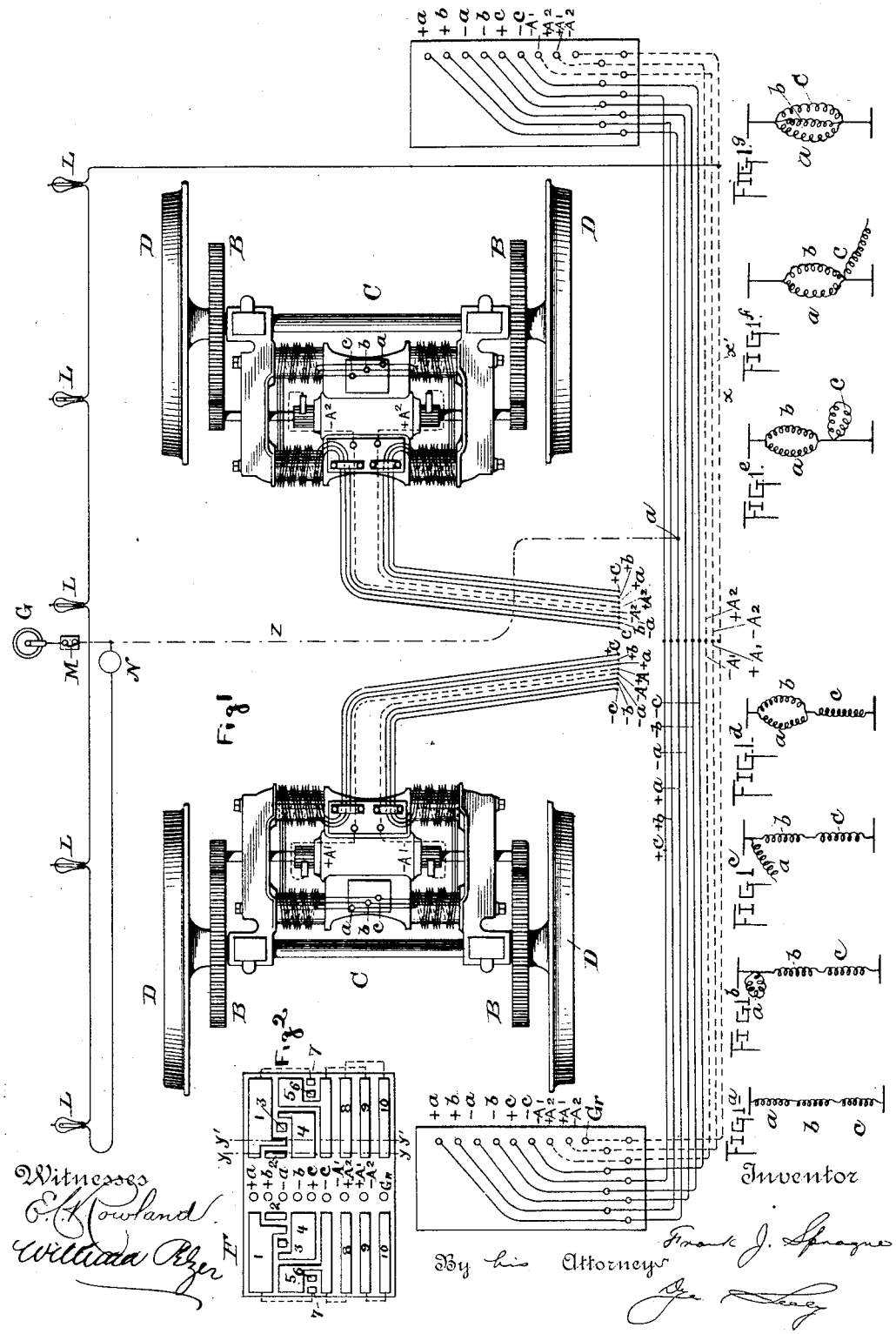
Witnesses
E. H. Rowland
William Pelzer
Inventor
Frank J. Sprague
By his Attorney

UNITED STATES PATENT OFFICE.

FRANK J. SPRAGUE, OF NEW YORK, N. Y., ASSIGNOR TO THE SPRAGUE ELECTRIC RAILWAY AND MOTOR COMPANY, OF SAME PLACE.

ELECTRIC MOTOR AND REGULATING DEVICE THEREFOR.

SPECIFICATION forming part of Letters Patent No. 481,739, dated August 30, 1892.

Application filed April 29, 1889. Serial No. 309,031. (No model.)

*To all whom it may concern:*

Be it known that I, FRANK J. SPRAGUE, a citizen of the United States, residing at New York city, in the county of New York and State of New York, have invented a certain new and useful Improvement in Electric Motors and Regulating Devices Therefor, of which the following is a specification.

The object of my invention is to regulate the mechanical effects—that is, the speed or power, or both—of electric motors in a simple and effective way, especially the motors used for propelling vehicles on electric railways, and especially, also, to regulate simultaneously two or more motors, and to enable the regulation of one or more motors to be performed at two or more different points and by the use of two or more independent switches or commutators.

In electric street-railways, in which a car sometimes runs in one direction and sometimes in the other, it is desirable to so arrange the regulating devices that the regulation of the motors can be accomplished from either end of the car, so that the operation may always be performed at the end of the car which is the forward one. In street-railways I have found it desirable to use two electric motors on each car, and such motors I connect and arrange so that they may be regulated simultaneously, and I connect both motors with a commutator or regulating device at each end of the car, whereby the operator at either end of the car has full control of both motors. The manner in which I prefer to make such commutators act to regulate the motors is by changing the connections of sections of coils on their field-magnets from series to multiple arc or from multiple arc to series, and by so constructing the commutators that various combinations of series and multiple arc can be made I vary the resistance and magnetizing effect of the coils, and thereby am enabled to produce every required variation of speed and power of the motors.

My invention is illustrated in the accompanying drawings.

Figure 1 is a diagram of the connections of an electric-railway car embodying my invention. Figs. $1^a$ to $1^g$ are diagrams showing the different combinations of the field-coil sections; and Fig. 2 represents the revolving cylinder of one of the regulating-switches, the same being developed or laid out in a plane.

Referring to Fig. 1, A′ and $A^2$ represent the two electric motors, they being of that character having a terminal at either end of the armature, the positive and negative terminals of the two motors being indicated by the usual signs. The armature-shafts of the motors are geared to wheels B upon driving-axles C, carrying wheels D. At each end of the car is placed one of the switches or commutators, each of which consists generally of the cylinder F, of insulating material, such as wood, on which are placed a number of metal contact-plates divided into two sets, and which are numbered in the drawings from 1 to 10 and are of the shape shown. The regulating-plates, or those which control circuits for regulating the motors are duplicated, but the plates used for reversing are oppositely connected in the two sets. This cylinder revolves against a vertical row of spring-pressed contact-buttons, which are represented in Fig. 2 by the vertical row of small circles. The same contact-buttons are also illustrated in Fig. 1 by the vertical rows of small circles on the rectangles at the two ends of the diagram.

G represents the contact-trolley, by which current may be supplied to the motors from the stationary conductor; but it is to be understood that my invention is applicable to other forms of electric railways besides those in which current is taken from an overhead conductor, it being useful with all modes of supplying current, including the use of batteries on the car. The trolley G forming one terminal the other terminal is represented by the wire $x$, which is connected with the earth through the axles of the car, or where a round metallic circuit is used the wire $x$ is connected with the return side of said circuit. The field-magnets of each motor are wound with three separate sections of coils, which may be designated as coils $a$, $b$, and $c$. The buttons of the two switches which form terminals for such coils are designated by the same letters, with the addition of the sign + or − to show which terminal of the coil is connected to each button.

The general circuit of the two motors is as follows: Starting at the trolley or other movable terminal G, the circuit is by the wire $z$ to the central or intermediate point $a$, and, as shown, this point is connected by conductors extending along the vehicle with the buttons marked $+a$ on each of the two switches, and also by separate circuits through the fields of the two motors in multiple arc to each other, the sections of the fields themselves being connected according to the position of the respective switches, then through the armature of each motor in series with its field, and finally from the motor-terminals marked $-A'$ and $-A^2$ back to the wire $x'$, which is connected to a button of each switch, the connection from this point to the ground being dependent on the position of the switches.

In one position of the line of contact-buttons relative to the switch—that is to say, when such buttons rest only on the insulating material of the switch—the circuit of both motors is broken. Suppose, however, the cylinder of either switch to be turned so as to bring the line of buttons into the position on the switch indicated by the dotted line $y\ y$. When in this position, the connection of the sections $a\ b\ c$ and the field-magnet coils of both motors is as illustrated in Fig. 1$^a$—that is to say, the three sections of each field-magnet are in series with each other—and the resistance of the field-magnet coils being thus at its highest point the current is limited thereby and the strength of the field-magnet is such that the speed and power are low. The circuit will be as follows: from the $+a$ button resting on plate 1 to the field-magnet of motor $A'$, through the section $a$ of the coils of said field-magnet to the wire marked $-a$, back to the corresponding switch-button which is resting on the plate 2 and so is connected with the $+b$ button, and thence by the wire marked $+b$ around the $b$ coil of the field-magnet of motor $A'$ and out by wire marked $-b$ to the corresponding button which is on plate 4, and so is connected with the $+c$ button, thence by wire $+c$ through the $c$ sections of the field-coils of motor $A'$ to the $-c$ wire and back to the $-c$ button, which is resting on plate 5. Plate 5 is connected by a wire, as indicated, with plate 9, and on this plate rests the button which is joined to the $+$ terminal of motor $A'$ and the $-$ terminal of motor $A^2$. From this button the circuit passes through the armatures of the two motors in multiple arc to each other, returning by the wire connected to the button marked $-A'$ and $+A^2$, which button is resting on the plate 8, which is connected by a wire with plate 10, on which rests the button connected with the ground-wire.

While I have just described only the field-circuits of motor $A'$, it is evident that the magnet of motor $A^2$ will have precisely the same connections, and it is evident, also, that the field connections of both motors may be affected by the switch at the other end of the car, as indicated at the right of the drawings. It will further be seen that in the connection just described each motor has its sections of field-coils all in series with each other and with the armature, while the two motors are in multiple arc relative to each other, the current branching through the field-coils of the two motors and the branches uniting at $-c$ and again dividing through the two armatures, so that both motors may be reversed by the operation of one reversing device. By a further movement of the switch in the same direction, such as will bring the buttons into the position indicated by the dotted line $y'\ y'$, the field-coils are brought into the relation indicated by Fig. 1$^b$, with the coil $a$ short-circuited and the other two coils in series with each other, this being effected by the $+a$ and $-a$ buttons both resting upon the plate 1, while the connections of the other terminals remain unchanged. The third step in the revolution of the cylinder by bringing the $-a$ button onto the plate 3, which is not connected with any other part, disconnects the end of the coil $a$ from the circuit altogether, leaving the coils $b\ c$ in series, as before. This condition is shown in Fig. 1$^c$. The next movement brings the coils into the relation of Fig. 1$^d$, the terminals $+a$ and $+b$ being both on the plate 1 and $-a$ and $-b$ being both on plate 4, together with $+c$, so that $a$ and $b$ are in multiple arc to each other and in series with $c$. The next movement results in short-circuiting the coil $c$, as illustrated in Fig. 1$^e$, leaving $a$ and $b$ still in multiple arc to each other, the buttons $+a$ and $+b$ being still both on plate 1, $-a$ and $-b$, $+c$ and $-c$ being all on plate 5. Fig. 1$^f$ shows the next movement, the only change being that $+c$ is on the unconnected block 6, so that one end of the $c$ coil is disconnected from the circuit. The final movement produces the connections shown in Fig. 1$^g$, in which all three of the coils are in multiple arc to each other, with their resistance at a minimum, and the greatest strength of field and also of armature current is produced. At this time $+a$ and $+b$ are both on plate 1 and $+c$ is on plate 7, which is connected by a wire with 1. $-a$ and $-b$ are both on plate 5 and so is $-c$, and plate 5 is connected with plate 9, from which the armature-circuits extend, as previously explained. It will be seen, therefore, that in the seven positions of the switch described variations of the field strength from a weak to a very strong field are produced in both the motors simultaneously, and that these variations can be produced in both motors by the movement of either of the two switches.

In order to reverse the direction of movement of the car, the direction of the current must be changed in a reversible part of the motors, and this is accomplished by turning the switch in the other direction, so that the buttons are on the left-hand set of contact-plates upon the cylinder. On this set the plates 5 and 8 are connected together and also the plates 9 and 10, which results in connecting the $-c$, the common terminal of the two field-circuits, with $-A'$ and $+A^2$ and in connecting $+A'$ and $-A^2$ with the ground-wire $x$ instead of the contrary arrangement which exists on the right-hand set of plates, whereby the armature-circuits of both motors are reversed by either of the common switches. The other connections of this set of plates are the same as those before described, so that the same variations of the field-magnets can be made as before.

L L are incandescent electric lamps connected in series across the motor-line and used for lighting the car.

M indicates a fusible safety-catch for the motor-line, and N a switch for the lighting circuit.

What I claim is—

1. The combination, with an electric motor, of two regulating commutators or switches therefor connected in multiple arc to each other, contacts and circuits extending therefrom to the source of power and making an invariable connection with said source, and other contacts and circuits extending therefrom to the motor-circuit for adjusting said motor-circuit to produce variations in mechanical effects in said motor, each of said regulating-switches having a point of open circuit, whereby either of said switches may be used alone and independently of the other to regulate said motor, substantially as set forth.

2. The combination, with two electric motors, of two regulating commutators or switches therefor connected in multiple arc to each other, contacts and circuits extending therefrom to the source of power and making an invariable connection with said source, and other contacts and circuits extending therefrom to both motors for varying the mechanical effects in both said motors simultaneously by the adjustment of the motor-circuits, each of said switches having a point of open circuit, whereby either of said switches may be used alone and independently of the other for regulating both motors, substantially as set forth.

3. The combination, with an electric motor, of two regulating commutators or switches therefor connected in multiple arc to each other, each provided with contacts and circuits extending therefrom for varying the mechanical effects in said motor and with contacts and circuits for reversing the direction of rotation of said motor, substantially as set forth.

4. The combination, with an electric motor, of a regulating commutator or switch composed of a cylinder having metal contact-plates and a row of contact-buttons adapted to bear on said plates, said buttons being connected to the two terminals of the line and motor, to a series of coils for regulating the resistance of the motor-circuit, and to a reversible part of the motor, substantially as set forth.

5. The combination, with an electric motor, of a regulating commutator or switch composed of a cylinder having two sets of contact-plates, each set comprising regulating-plates and reversing-plates, the reversing-plates being oppositely connected in the two sets, and a row of contact-buttons adapted to bear on either set of plates, the said buttons being connected to the two terminals of the line and motor, to a series of coils for regulating the resistance of the motor-circuit, and to a reversible part of the motor, substantially as set forth.

6. The combination, with an electrically-propelled vehicle, of a vertical cylindrical switch or commutator on each end of the vehicle, having a vertical row of contact-buttons bearing thereon, corresponding buttons on the two switches being connected by conductors extending along the vehicle, and an electric motor connected to said conductors at an intermediate point of the vehicle, each of said switches being provided with connections for regulating the resistance of the motor-circuit and reversing the motor, substantially as set forth.

7. The combination, with a vehicle, of a propelling motor and two regulating commutators or switches therefor connected in multiple on the two ends of the vehicle, respectively, each provided with circuits and contacts for regulating the resistance of the motor-circuit and reversing the motor and each having a point of open circuit, whereby one only may be used at a time to control the motor, substantially as set forth.

8. The combination, with an electric motor, of a regulating commutator or switch composed of a cylinder having two sets of contact-plates separated by an intermediate space and a series of contact-buttons adapted to bear on both sets of contact-plates but narrower than the said separating-space, part of said contact-plates acting to regulate the resistance of the motor-circuit when brought in contact with said buttons and being duplicated in the two sets, the remaining plates being connected oppositely in the two sets and acting to reverse the motor, substantially as set forth.

9. In a regulating commutator or switch for an electric motor, the combination, with an insulating revolving cylinder, of two sets of contact-plates thereon, a portion being duplicates and a portion being duplicates in form but oppositely connected electrically, the former adapted to bear upon contact-buttons connected to coils in the motor-circuit and to connect said coils so as to regulate the resistance of the said circuit and the latter adapted to bear upon contact-buttons connected to a reversible part of the motor, whereby the same regulation may be effected with opposite directions of rotation of the armature by a continuous movement of the cylinder, substantially as set forth.

10. The combination, with an electric motor, of a regulating commutator or switch composed of a cylinder F, having a series of contact-plates thereon, a contact-button $a$, connected to one motor and line-terminal, a contact-button $Gr$, connected to the opposite line-terminal, an intermediate series of contact-buttons $+b\ -a\ +c\ -c'$, connected to a series of coils for regulating the resistance of the motor-circuit, and additional contact-buttons connected to the terminals of a reversible part of the motor, substantially as set forth.

11. The combination, with a vehicle, of two electric motors, one for each axle of said vehicle, two regulating switches or commutators, one at each end of the vehicle, a series of conductors extending along the vehicle and connecting corresponding parts on the two switches, there being two such conductors for the outer field-magnet terminals, respectively, and two for the armature-terminals, respectively, individual branches from each of said conductors to both of the motors, and line connections for the first and the last of said conductors, respectively, substantially as set forth.

12. The combination, with an electric motor, of two circuit-controlling devices for regulating the mechanical effects in said motor, two reversing-switches, one for each controlling device, and common operating means for each controller and its respective reversing-switch, substantially as set forth.

13. The combination, with an electric motor, of two controlling devices for regulating the current in the motor-circuit and two reversing-switches, one for each controlling device, with common operating means for each controller and its respective switch, substantially as set forth.

14. The combination, with two electric motors connected in multiple arc with the same circuit, of two independent regulating commutators or switches composed each of a cylinder having a number of metal contact-plates and a series of contact-buttons adapted to bear on said plates, one button on each switch being connected to the corresponding button on the other switch and to one line and motor terminal, a second button on each switch being connected to the corresponding button on the other switch and to the opposite line and motor terminal, and the remaining buttons being connected to a series of coils for regulating the resistance of the motor-circuit and to a reversible part of the motor, substantially as set forth.

15. The combination, with two motors in multiple arc having a common circuit at a point between their fields and armatures, of two reversing-switches, each acting to reverse both motors, and two regulating devices connected to the two reversing-switches, respectively, so as to be operated by a common means, substantially as set forth.

16. The combination, with two motors in multiple arc having a common circuit at a point between their fields and armatures, of a common reversing-switch having two terminals adjacent to the line and field terminals and a circuit from said two terminals branching to the two armatures, substantially as set forth.

This specification signed and witnessed this 27th day of April, 1889.

FRANK J. SPRAGUE.

Witnesses:
WILLIAM PELZER,
H. W. SEELY.